US007688966B2

(12) United States Patent  (10) Patent No.:  US 7,688,966 B2
Kumar et al.  (45) Date of Patent:  \*Mar. 30, 2010

(54) USER INTERFACE PERSISTENT CONTEXT AREA

(75) Inventors: Janaki P. Kumar, Palo Alto, CA (US); Lewis W. B. Charnock, Harleysville, PA (US); Vidya Chadaga, Sunnyvale, CA (US); Johnnie Wilkenschildt, San Francisco, CA (US); Joaquin Garcia Fink, Mountain View, CA (US); Susanne Zeller, Campbell, CA (US); Vivek Bhanuprakash, Sunnyvale, CA (US); Vyacheslav Gomov, Cupertino, CA (US); Deborah Rodgers, Framingham, MA (US)

(73) Assignee: SAP AG, Walldorf (DE)

( * ) Notice: Subject to any disclaimer, the term of this patent is extended or adjusted under 35 U.S.C. 154(b) by 1051 days.

This patent is subject to a terminal disclaimer.

(21) Appl. No.: 10/886,162

(22) Filed: Jul. 7, 2004

(65) Prior Publication Data

US 2005/0152529 A1   Jul. 14, 2005

Related U.S. Application Data

(60) Provisional application No. 60/512,795, filed on Oct. 20, 2003.

(51) Int. Cl.
 *H04M 3/428* (2006.01)
(52) U.S. Cl. ............... 379/265.09; 370/352; 397/93.17; 397/93.23; 397/266.06; 340/5.91; 709/204; 709/224; 715/752

(58) Field of Classification Search ............ 379/265.01, 379/266.01, 265.09, 93.17, 93.23, 266.06; 370/396, 352; 709/224, 204; 705/38; 340/5.91; 715/752
See application file for complete search history.

(56) References Cited

U.S. PATENT DOCUMENTS

| 6,064,730 | A  | * | 5/2000  | Ginsberg ............... 379/265.09 |
| 6,134,318 | A  | * | 10/2000 | O'Neil .................. 379/266.01 |
| 6,175,562 | B1 |   | 1/2001  | Cave                                |
| 6,178,239 | B1 | * | 1/2001  | Kishinsky et al. ...... 379/266.07  |
| 6,230,199 | B1 | * | 5/2001  | Revashetti et al. .......... 709/224 |
| 6,330,243 | B1 | * | 12/2001 | Strandberg .................. 370/396 |
| 6,393,015 | B1 | * | 5/2002  | Shtivelman ................. 370/352 |
| 6,611,590 | B1 | * | 8/2003  | Lu et al. ................. 379/265.09 |
| 6,697,858 | B1 | * | 2/2004  | Ezerzer et al. ............. 709/224 |
| 6,871,212 | B2 | * | 3/2005  | Khouri et al. .............. 709/204 |

(Continued)

FOREIGN PATENT DOCUMENTS

EP   0926614   6/1999
WO   00/72562   11/2000

*Primary Examiner*—Gerald Gauthier
(74) *Attorney, Agent, or Firm*—Fish & Richardson P.C.

(57) ABSTRACT

An improved user interface improves call center agent responsiveness by persistently (i.e., without interruption) displaying key information at fixed locations in an integrated user interface. The integrated user interface may be partitioned into physical areas on the agent's display screen. While some areas of the agent's display screen may rapidly change, at least one area in a reserved location may persistently display a collection of interaction-specific information that the call center agent can view at all times during a call/chat/email session. The user interface persistently displays each piece of key information at a reserved and unchanging physical location on the agent's screen.

16 Claims, 6 Drawing Sheets

U.S. PATENT DOCUMENTS

| | | | |
|---|---|---|---|
| 7,376,902 B2 * | 5/2008 | Lueckhoff | 715/752 |
| 2002/0042772 A1 * | 4/2002 | Rudman et al. | 705/38 |
| 2004/0213207 A1 * | 10/2004 | Silver et al. | 370/352 |
| 2007/0229222 A1 * | 10/2007 | Leeds | 340/5.91 |

* cited by examiner

USER INTERFACE PERSISTENT CONTEXT AREA

RELATED APPLICATION

The present application claims the benefit of the filing date of U.S. Provisional Application No. 60/512,795, which was filed on Oct. 20, 2003. The entire contents of U.S. Provisional Application No. 60/512,795 are hereby incorporated by reference into the present application.

TECHNICAL FIELD

This invention relates to computing systems, and more particularly to software for use in call centers.

BACKGROUND

In today's business society, customer relations and customer satisfaction are critical for successful and profitable operations. Customers purchase various products and services from a variety of providers, and use various purchase means. When customers purchase various products and services, they often have questions, concerns, or complaints about their purchases. To maximize customer satisfaction, businesses must be capable of responding quickly and effectively to customer questions, concerns, or complaints. Many businesses employ customer care agents in interaction centers (IC) who are responsible for interacting with customers. These agents may interact with customers personally or over the telephone. These chat sessions allow agents to communicate quickly and easily with customers all over the world.

In recent years, interaction centers have become much more widespread. A call center is one type of IC that has agents to place and receive calls. The interaction center agents may deal with, for example, customer service calls or sales calls. The interaction centers manage many efforts, and interaction center agents working in these centers often place and receive thousands of calls to and from various customers in different regions of the country.

In recent years, telephone call centers have become much more widespread. The call centers manage many efforts, and calling agents working in these centers often place thousands of calls to various customers in different regions of the country. These agents often use headsets to speak with customers while the agents concurrently enter information relating to the customers into a computer workstation.

There are a wide variety of transactions carried out by these telephone call centers. For example, banks may want to contact current customers and ask them if they would be interested in obtaining a new credit card. Long distance telephone companies may want to contact homeowners and ask if they would be interested in switching long distance carriers. Fundraisers may call individuals to ask for donations. Various other telemarketers may call homeowners or business owners to solicit various products or services.

When an agent speaks with individuals over the phone, the agent's success in processing the interaction may depend on certain key information that the agent needs to remember throughout the interaction session. For example, one crucial piece of information that the agent needs to have instant access to is the individual's name. An interaction may fail if the agent forgets the individual's name. Often, call center agents write the name down on a piece of paper with a pen to ensure the proper name is always instantly recallable. However, this is inefficient, as the agent must disengage from processing the information using the computer terminal.

At any time during the course of an interaction, the call center agent may need to refer to certain key information (e.g., customer name, product name). Call center software applications generally display, for example, at certain times and in certain locations, the individual's name on the screen in a graphical user interface (GUI). During a call, however, a call center agent reviews rapidly changing screens, or view sets, of information. As the GUI changes view sets to display different information, the name may be removed, or moved to a different location so that the agent must search for the name. This can add stress to the agent, and delay the agent's responsiveness to the individual.

Typically, a web-based user interface does not persistently display key information in the same physical location on the screen throughout the session. Inaccessibility of key information may impair the agent's performance during a call. In a web browser interface, the typical navigation bar may display some information persistently, but it may not be adequate to display all of the critical information in a format that the agent can easily digest while the agent enters data and navigates through application screens.

Some user interfaces display certain key information, but the information is displayed using multiple windows or using segregated (unintegrated) areas of the display. In some user interfaces, the display is integrated, but key information is not persistently displayed at a fixed screen location throughout an interaction.

SUMMARY

An improved user interface improves call center agent responsiveness by persistently (i.e., without interruption) displaying key information at fixed locations in an integrated user interface. The integrated user interface may be partitioned into physical areas on the agent's display screen. While some areas of the agent's display screen may rapidly change, at least one area in a reserved location may persistently display a collection of interaction-specific information that the call center agent can view at all times during a call/chat/email session. The user interface persistently displays each piece of key information at a reserved and unchanging physical location on the agent's screen.

In one embodiment, key information may be displayed at fixed locations on the screen within a typically rectangular area called the "persistent context area." This persistent context area may be sub-divided, for example, into three topic areas: a customer interaction area, an alerts area, and a contact information area. Call center agents can quickly refer to key pieces of information during a session while information outside the persistent context area may be rapidly changing.

Certain methods and computer program products described may provide one or more advantages. For example, a call center agent's performance may be improved by placing crucial information at fixed locations in front of the agent at all times. This may give the agent the ability to recall key information instantly and accurately, resulting in improved agent responsiveness and service quality. As such, the customer may experience a higher quality of service.

The details of one or more embodiments are set forth in the accompanying drawings and in the description below. Other features, objects, and advantages will be apparent from the description and drawings, and from the claims.

DESCRIPTION OF DRAWINGS

Like reference symbols in the various drawings indicate like elements.

DETAILED DESCRIPTION

A user interface for use by a call center agent may persistently display key information at a fixed location on a display screen while integrating that display with the interactive areas of the user interface. The key information may be displayed in a screen integrated with interactive portions of the user interface. As such, the key information is not segregated in a separate window from the interactive areas.

The persistent context area may support a call center agent's customer responsiveness by making information critical to a customer's experience available both quickly and easily. In some applications, the agent's response speed may be important because call center sessions may be very time sensitive. Furthermore, the quality of the interaction experience may improve if the agent has unimpeded access to the most critical information. For example, customer service may suffer if, at any time during the session, the agent forgets the customer's name and cannot immediately find it on the screen. However, if the agent can readily access the customer's name, as well as other key information, at all times in a persistent context area, the customer is likely to experience a higher quality of service.

Figure 1:
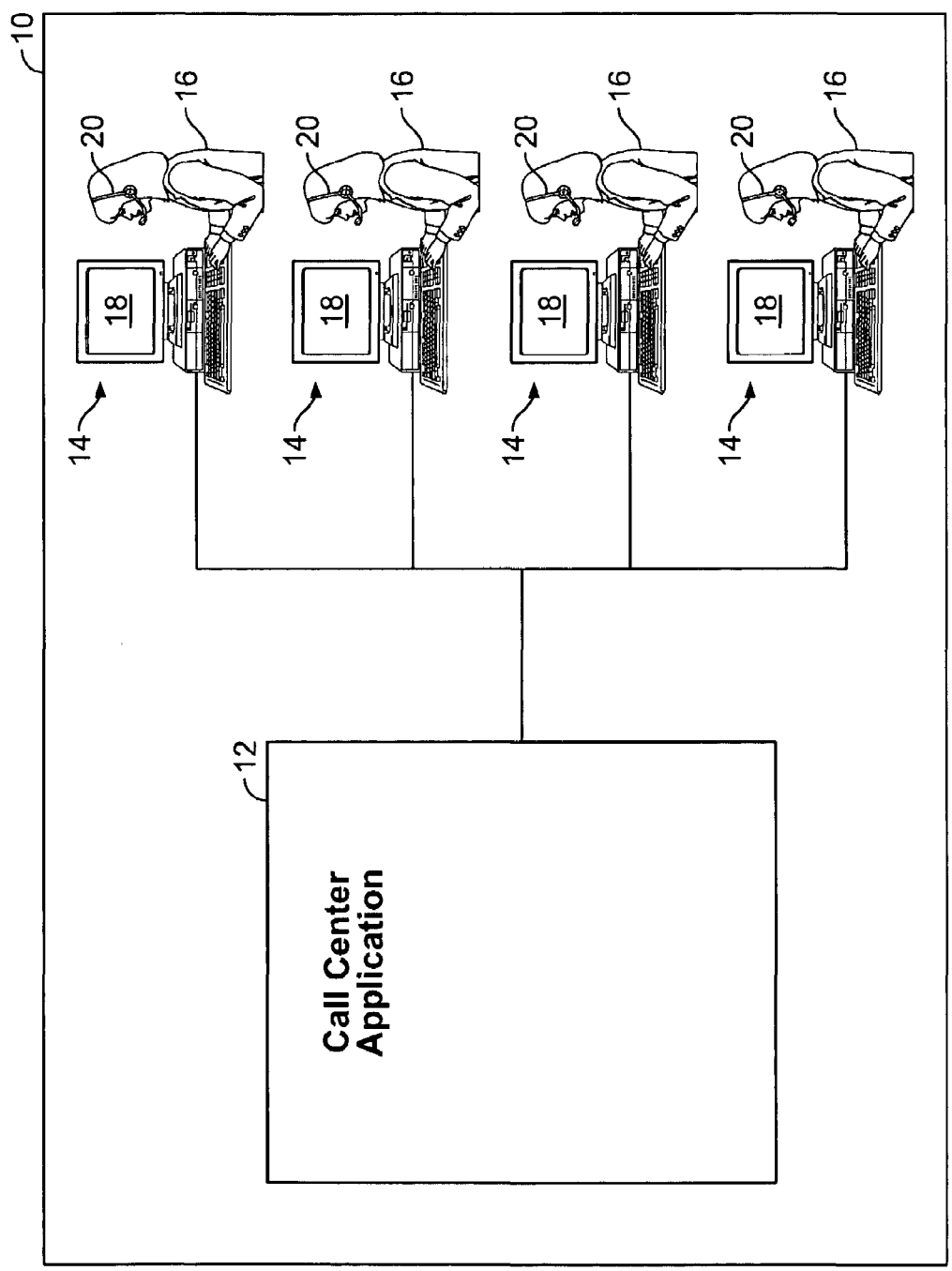
FIG. 1 is a call center environment.

FIG. 1 shows a call center environment 10 that includes a call center application 12. The call center application 12 contains instructions that, when executed, cause a user interface to be displayed on one or more agent work stations 14. At each workstation 14, an agent 16 operates a terminal 18 on which the call center application is displayed. The agent 16 receives or places calls using the terminal 18 and, in some examples, a headset 20. Each agent 16 in the call center 10 may process many interactions each day. An interaction, also referred to as a session, may begin with either the agent contacting a customer, for example, or a customer contacting the call center 10. In one example, the customer may call the call center and speak with one of the agents 16.

Figure 2:
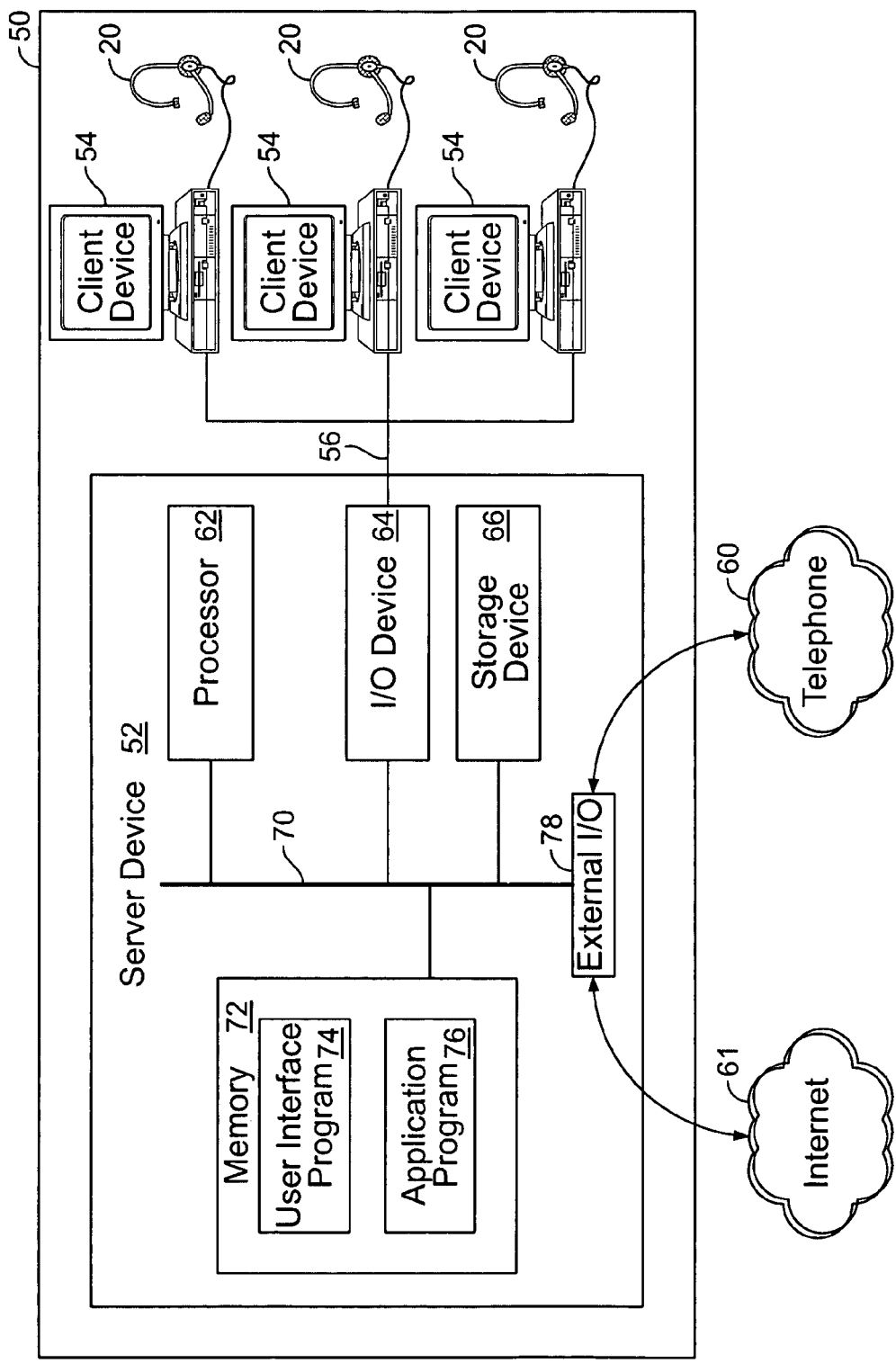
FIG. 2 is a block diagram of a computing system in the call center of FIG. 1.

The computing system on which the call center application 12 is implemented is illustrated in FIG. 2. A call center system 50 includes a server device 52 and at least one client device 54. Each client device 54 may be, for example, used by the agent 16 as an agent workstation 14 (FIG. 1). The server device 52 is also connected to each client device 54 over a network 56. The network 56 transmits data between the server device 52 and each of the client devices 54. The server device 52 is connected to a telephone system 60. The telephone system may represent, for example, a POTS (plain old telephone system), or other telecommunication network that may be used to place and receive telephone calls. The server device 52 is also connected to the Internet 61. The connection to the Internet 61, the call center system 50 may interact with customers using, for example, Voice over Internet Protocol (VoIP), e-mail, web chat, web site self-service, and the like.

The server device 52 includes a processor 62, an I/O device 64, and a storage device 66. Each of the processor 62, the I/O device 64, and the storage device 66, are connected by a bus 70. The bus 70 transports information signals to effect data transfers between elements such as, for example, the processor 62 and the I/O device 64. The bus 70 is also connected to a memory 72. To execute the call center application 12, the processor 62 may retrieve stored program information from the storage device 66 over the bus 70 and store that information in the memory 72. A portion of that stored program information for the call center application 12 includes a user interface program 74, and a portion of that stored information program represents an application program 76. Under the control of the processor 62, the application program executes and causes, for example, the user interface program 74 to cause the display of information on one of the client devices 54. When this occurs, information passes through the I/O device 64, over the network 56, and into the client device 54 where it can then be displayed to the agent 16.

The server device 52 also includes an external I/O interface 78. The external I/O interface 78 manages the communications between the telephone system 60 and the server device 52. Information passes to and from the external I/O interface 78 over the bus 70. A call, for example, may pass through the external I/O interface 78 and reach a client device 54, which may include a headset 20 that the agent can wear when speaking to a customer. The information for a call may pass in analog form or may be converted to digital form when passing through the server device 52 in the call center 50. Other examples are possible as can be appreciated by one of skill in the art.

Figure 3:
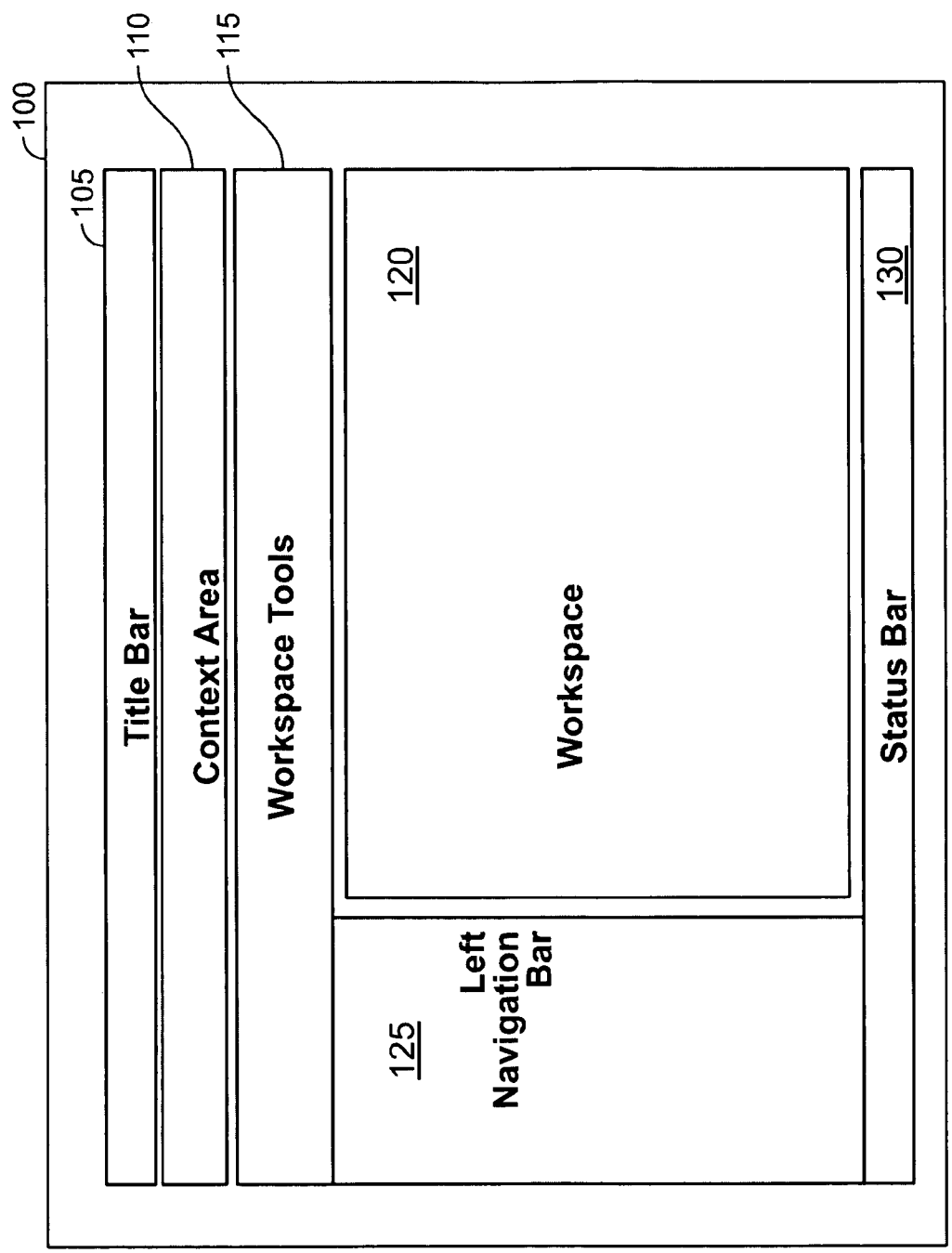
FIG. 3 is a graphical user interface (GUI) displayed by the computing system of FIG. 2.

The call center application 12 (FIG. 1) that is displayed on the agent workstation 14 is used by the agent 16 to process a transaction. As described earlier, a transaction begins when a call is established between an agent and, for example, a customer. The agent 16 processes the transaction (session) using a graphical user interface (GUI) 100 as shown in FIG. 3. In this example, the GUI 100 defines an area on the display screen that the agent can use to process an interaction. The GUI 100 includes a title bar area 105, a context area 110, a workspace tools area 115, a workspace area 120, a left navigation bar 125, and a status bar 130. This exemplary graphical user interface illustrates the use of an integrated display of persistent context information in the context area 110. While information displayed in the other areas of the GUI 100 may change rapidly during an interaction, the information displayed in the context area 110 remains persistently displayed. Accordingly, the agent 16 can quickly refer to key information in the context area 110 that is at a familiar location and displayed in a format that is easy for the agent 16 to quickly digest.

When processing an interaction, the agent typically uses a number of view sets that are displayed in the workspace 120. Each view set provides information for the agent to refer to, or input fields in which the agent can enter information obtained during the interaction. For example, the workspace area 120 may, at one point in the interaction, display a script that the agent reads to the customer describing a product. At a later point in the interaction, the workspace area 120 may display input fields that the agent can use to enter information obtained from the customer, such as sales order information that relates to the product that the agent previously described. As such, the workspace 120 may involve a number of view sets that change during the course of the interaction.

The interaction may require the agent to change the view sets in the workspace 120 using, for example, navigation tools in the left navigation bar 125. Such navigation tools may include forward and back buttons familiar to users of web-based browsers.

Information may also be displayed in the status bar 130 during the interaction. The status bar 130 information may relate to the view set that is currently being displayed in the workspace 120. Accordingly, as the view sets change in the workspace 120 during the course of the interaction, the information displayed in the status bar 130 may also change. Information may also be displayed in the title bar area 105. For example, the title bar may display information related to the specific call center application currently being executed.

Figure 4:
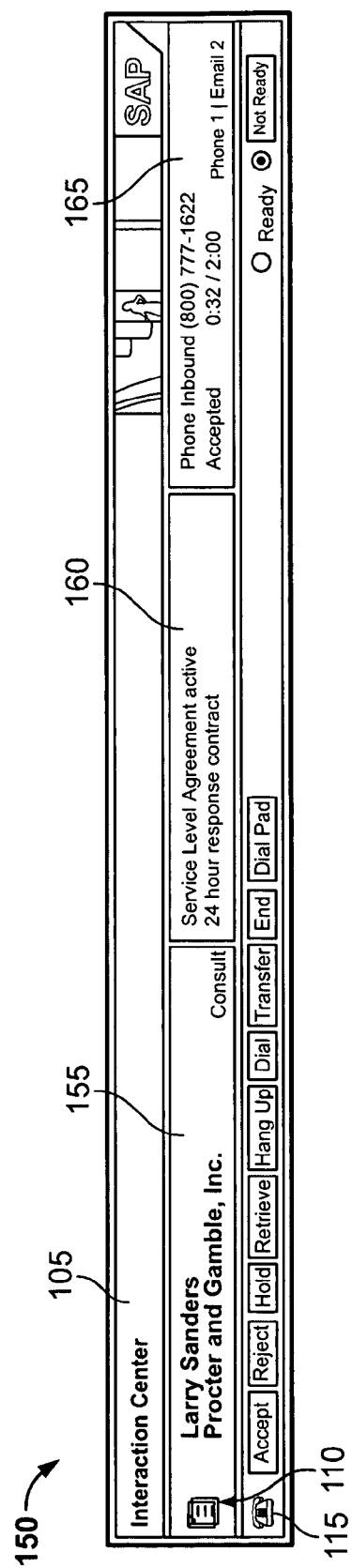
FIG. 4 is a persistent context area in a portion of the GUI of FIG. 3.

An exemplary GUI 150 that may be displayed in a portion of the GUI 100 (FIG. 3) is shown in FIG. 4. The GUI 150 includes an exemplary title bar area 105, an exemplary context area 110, and an exemplary workspace tools area 115. For present purposes, the context area 110 is the focus of this document, and the title bar area 105 and the workspace tools area 115 will not be described in detail.

Various key information may be displayed in the context area 110. In this example, the key information is organized into three areas. In this example, the three areas include a customer contact area 155, an alerts area 160, and a contact information area 165. Although this example uses three areas, the context area 110 may be subdivided into any practical number of areas such as, for example, one, two, four, five or more areas.

The customer interaction area 155 displays the contact name and company name of the party the agent 16 is speaking to during the interaction. Typically, the name represents the name of a customer. The customer interaction area 155 may also include an indication of the type of contact for the interaction. Typical contact types include consult, conference, call list, or transfer. By referring to the customer interaction area, the agent 16 can quickly recall the customer's name and the customer's company name, if applicable. As such, the agent can confidently process the interaction without fear of forgetting the name of the person to whom the agent is speaking.

The context area 110 may also include the alerts area 160. The alerts area 160 displays key information that the computing system 50 is configured to bring to the agent's 16 attention. If, for example, the customer to whom the agent is currently speaking has paid for a certain level of service, the alerts area may bring that fact to the agent's attention. As such, the agent can quickly refer to the alerts area 160 at any time during an interaction to determine what services to provide to the customer.

The context area 110 may also include the contact information area 165. The contact information area 165 displays key information about the instant interaction. Various types of information may be displayed in the contact information area 165. For example, the contact direction may be displayed. The contact direction indicates whether the call is inbound to the contact center, outbound from the contact center, or outbound from the agent to consult with someone else within the call center organization, or an outbound conference, which may involve the agent calling a number of individuals and speaking to them on a conference call. The contact information area 165 may also include a contact state indicator. Possible contact state indications include hold, ringing, accepted and wrap-up. The contact information area 165 may also include a statistical display of the time for the current contact state relative to the total time taken to process the interaction. In other examples, other contact information may be displayed.

An exemplary graphical user interface (GUI) 200 illustrates an example of the GUI 100 (FIG. 3). Similar to the GUI 100, the GUI 200 includes a title bar area 205, a context area 210, a workspace tools area 215, a workspace area 220, a left navigation bar 225, and a status bar 230. As such, the GUI 200 represents what the call center application 12 may display to the agent 16 at a point in time during interaction with a customer.

In this example, the context area 210 is subdivided into three areas, in accordance with the GUI 150 (FIG. 4). A first of these subdivided areas may be referred to as a customer contact area 255. The customer contact area 255 in this example includes the name of the contact, namely "Fred Merchant'" and the contact's employer, namely "JJ&F Salons."

A second subdivided area in the context area 210 may be referred to as an alerts area 260. In this example, the alerts area 260 indicates to the agent 16 that the current contact has been a bronze customer for five years and that there is an open delivery scheduled that is on time. As such, the alerts area 260 displays customer service information about the customer, as well as delivery and schedule information.

A third subdivided area in the context area 210 may be referred to as a contact information area 265. In this example, the contact information area 265 displays the direct sales number that the agent 16 can use to call the contact. In another example, in which the call is inbound to the call center, the displayed telephone number may indicate the telephone number dialed by the customer to initiate the interaction with the agent 16.

All of the foregoing information in each of the three areas 255, 260, 265 of this example is persistently displayed in the context area 210. Accordingly, the agent can refer to the key information in the context area 210 at any time during the interaction with the contact. For example, the agent 16 may be conversing with the contact and wish to refer to the contact by name. In that case, the agent 16 can confidently use the contact's name by simply looking to the reserved location in the context area 210 where the name of the current contact is persistently displayed.

While the agent 16 is processing the interaction, various view sets may be displayed in, for example, the workspace area 220. In this example, the workspace area 220 displays information about the current interaction. The displayed view set includes input fields for inputting data obtained by the agent from the contact during the interaction. This example also includes a record of recent interactions with the current contact. As can be appreciated by one of skill in the art, the agent 16 may cause various view sets to be displayed during the interaction. For example, the agent can use the left navigation bar 225 to navigate to various view sets related to different aspects of the interaction. For example, the agent may use the left navigation bar 225 to cause view sets related to sales order, service order, interaction record, and product catalog to be displayed during an interaction. As another example, the agent may select an e-mail button from the left navigation bar 225 to create an e-mail in the workspace area 220. As can be appreciated, numerous other view sets related to processing an interaction may be displayed for various business applications using the call center application 12.

For purposes of describing the behavior of the context area 210, the interaction may involve rapidly changing view sets being displayed in the workspace area 220. However, the key information displayed in the context area 210 remains fixed in reserved locations on the GUI 200. As such, the agent 16 can immediately refer to that key information at any time, independent of what view set is currently being displayed in the workspace area 220.

Although information in the context area 210 is persistently displayed, the displayed information may be updated as the agent processes the interaction. During an interaction, the agent may enter new key information into the workspace area 220. For example, the agent 16 may input the name of a new customer into a field in a view set displayed in the workspace area 220. Accordingly, the new information can then be displayed on the GUI 200 in the appropriate location in the context area 210. In this case, the newly entered contact name information would be immediately displayed in the customer contact area 255.

Figure 5:
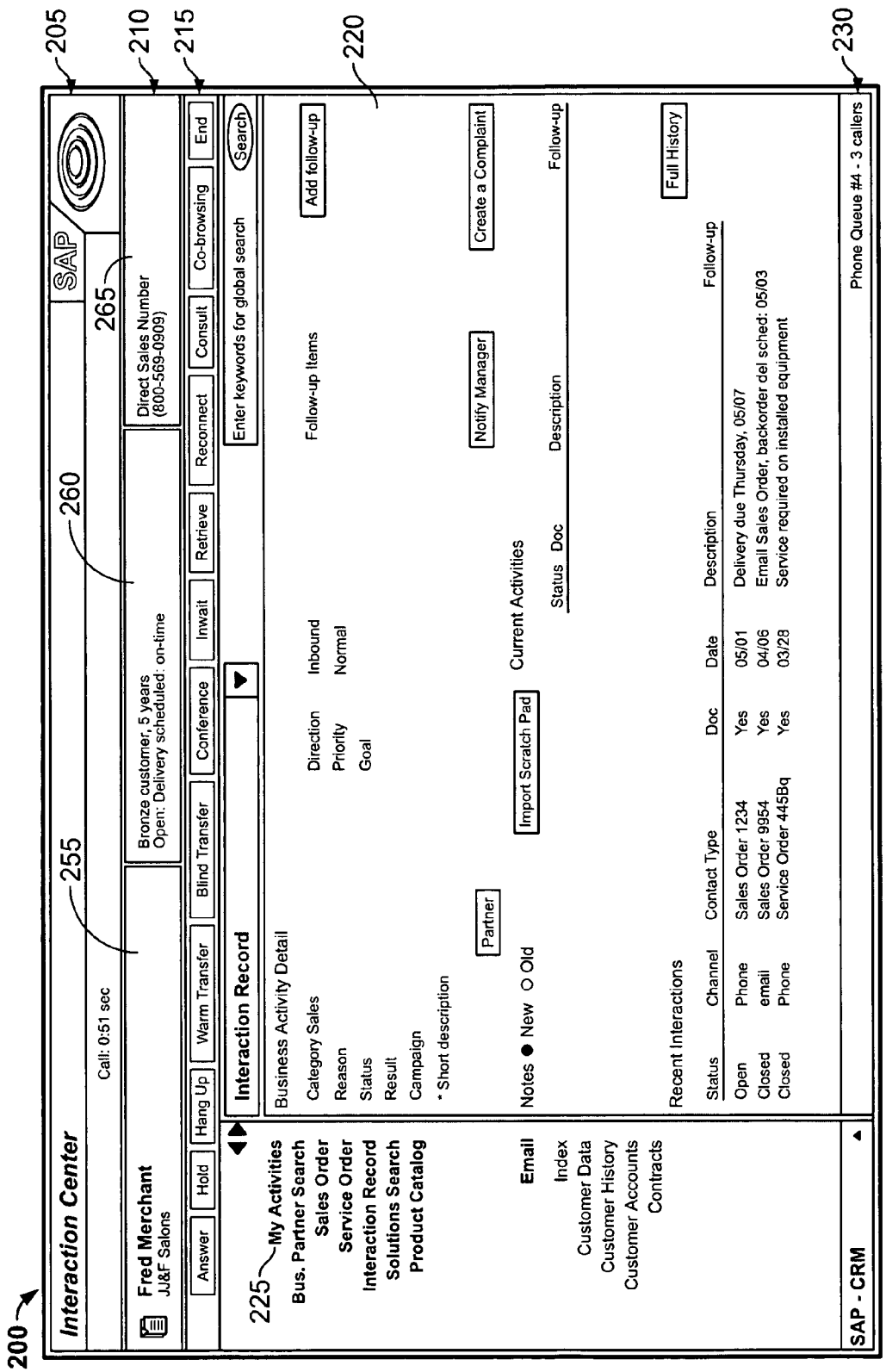
FIG. 5 is an exemplary GUI for a call center application, including a persistent context area.
Figure 6:
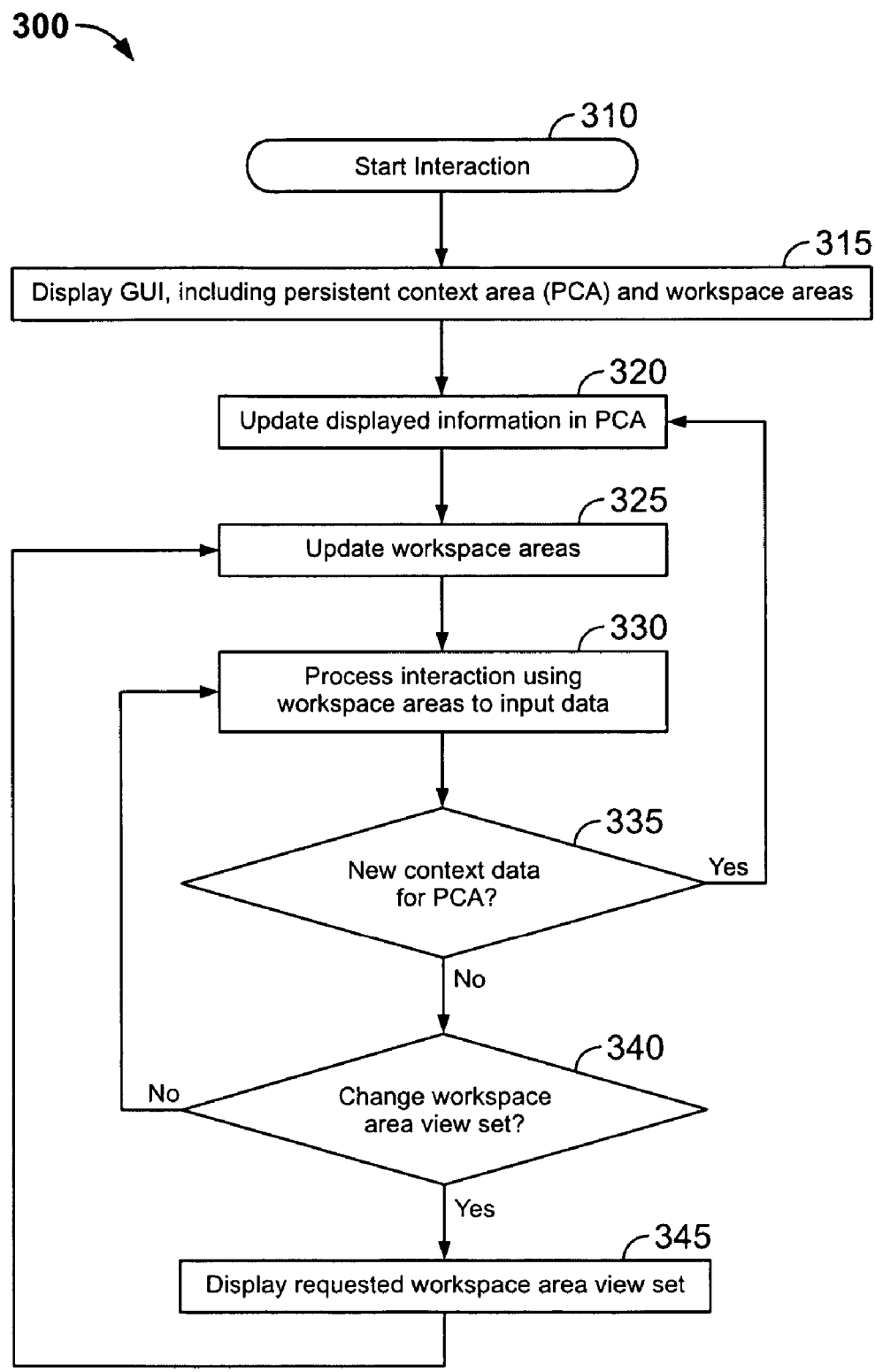
FIG. 6 is a flow chart of steps for displaying a GUI with a persistent context area for use in a call center application.

The behavior of the context area 110 (FIG. 3) or the context area 210 (FIG. 5) is illustrated by flow chart 300 shown in FIG. 6. The process steps for displaying a graphical user interface with a persistent context area for use by a call center agent begins with the start of an interaction at 310. As noted above, an interaction can begin, for example, either by the agent calling a customer, or a customer placing a call to the call center to speak with the agent 16.

As the interaction begins at 310, the call center application 12 causes the GUI 100 (FIG. 3) to be displayed on the terminal 18 at 315. This GUI 100 includes a persistent context area (PCA) and a workspace area, and may include other areas as has been described in the foregoing examples. Next, the information displayed in the PCA is updated at 320 according to available information about the interaction. As can be appreciated, information about the contact may or may not be available at this point in the interaction. If, for example, the agent initiated the contact, the name and telephone number of the contact may already be available for display in the PCA. If, however, the customer initiated the interaction, the context information might not be available for display in the PCA at 320. As the interaction continues, the agent will update the workspace area(s) at 325 to process the interaction. The agent's processing of the interaction may follow, for example, standard training procedures, or guidelines, or it may be more customer-driven as the agent responds to the customer.

As the customer provides new information to the agent during the interaction, the agent can process the interaction using the workspace area(s) to input this new information at 330. If the new information includes new context information for the PCA at 335, the information displayed in the PCA may be updated according to the step at 320. If new context information is not received, then the agent can continue to process the interaction. At 340, the agent may process the interaction in the currently-active workspace area view set, or change the workspace area view set in order to process a different aspect of the interaction. If the agent does not change the workspace area view set at 340, then the agent will process the interaction using the workspace area(s) to input data at 330. If, however, the agent does change the workspace area view set at 340, then the GUI 100 will display the workspace area view set requested by the agent at 345. Accordingly, the GUI 100 will update the display workspace area(s) at 325. The process can continue from that point.

The foregoing steps for displaying the graphical user interface with a persistent context area may continue throughout the interaction. When the interaction is terminated, then the procedure will stop until a new interaction is started at 310.

A number of embodiments have been described. Nevertheless, it will be understood that various modifications may be made. For example, if the customer were to contact the call center via e-mail or web chat, the relevant information, such as e-mail address, may automatically be displayed in the PCA. In some examples, the customer could supply additional information, such as may be contained in an electronic business card, that may automatically be displayed in the PCA. Such additional information may include a link to a website, or such information could relate to, for example, the customer's business or industry.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

Accordingly, other embodiments are within the scope of the following claims.

What is claimed is:

1. A method of processing an interaction in a call center, the method comprising:

displaying predetermined information to which a call center agent may need to frequently refer throughout a session with a specific contact person, the predetermined information relating to the session being conducted with the specified contact person, the predetermined information being persistently displayed in a first area located at a reserved location within a portion of a graphical user interface (GUI), the predetermined information including an indication of whether the agent or the contact person initiated the session, wherein if the call center agent initiated the session by calling a telephone number of the contact person, then the indication comprises the telephone number of the contact person called by the call center agent, and wherein if the contact person initiated the session by calling a telephone number of the call center, then the indication comprises the telephone number of the call center called by the contact person; and displaying a plurality of view sets of information in a second area of the GUI, wherein the agent may cause the plurality of the view sets of information to be displayed during the session in order to process the interaction.

2. The method of claim 1, wherein the predetermined information includes the contact person's name.

3. The method of claim 2, wherein the predetermined information includes a notification to the call center agent that additional information relating to the contact person is stored in a database.

4. The method of claim 1, wherein the predetermined information includes an indication of the length of time the session has lasted.

5. The method of claim 1, wherein one view set in the plurality of view sets of information includes a view set selected from the group consisting of: interaction record, sales order, service order, knowledge search, and interactive script.

6. The method of claim 1, wherein the interaction comprises an e-mail exchange.

7. The method of claim 1, wherein the predetermined information comprises a level of customer service associated with the contact person.

8. The method of claim 1, wherein the predetermined information includes information that identifies the contact person's employer.

9. The method of claim 1, wherein the interaction comprises a web-based chat session.

10. A computer-readable data storage medium including a computer program product, the computer program product containing instructions that, when executed, cause a processor to perform operations to display information that an agent may use to process an interaction in a call center, the operations comprising:

display predetermined information to which a call center agent may need to frequently refer during an entire session with a specific contact person, the predetermined information relating to the session being conducted with the specified contact person, the predetermined information being persistently displayed in a first area located at a reserved location within a first portion of a graphical user interface (GUI), the predetermined information including an indication of whether the agent or the contact person initiated the session, wherein if the call center agent initiated the session by calling a telephone number of the contact person, then the indication comprises the telephone number of the contact person called by the call center agent, and wherein if the contact person initiated the session by calling a telephone number of the call center, then the indication comprises the telephone number of the call center called by the contact person; and display a plurality of view sets of information in a second area of the GUI, wherein the agent may cause the plurality of the view sets of information to be displayed during the session in order to process the interaction.

11. The computer-readable data storage medium including the computer program product of claim 10, wherein the predetermined information includes the contact person's name.

12. The computer-readable data storage medium including the computer program product of claim 10, wherein the predetermined information includes an indication of the length of time the session has lasted.

13. The computer-readable data storage medium including the computer program product of claim 10, wherein the predetermined information comprises a level of customer service associated with the contact person.

14. The computer-readable data storage medium including the computer program product of claim 10, wherein the predetermined information includes information that identifies the contact person's employer.

15. A computer-readable data storage medium including a computer program product, the computer program product containing instructions that, when executed, cause a processor to perform operations to display information that an agent may use to process an interaction in a call center, the operations comprising:

display context information for a specific contact person during an entire session with the specified contact person, the context information including an indication of whether the agent or the contact person initiated the session, wherein if the call center agent initiated the session by calling a telephone number of the contact person, then the indication comprises the telephone number of the contact person called by the call center agent, and wherein if the contact person initiated the session by calling a telephone number of the call center, then the indication comprises the telephone number of the call center called by the contact person, the context information relating to the session being conducted with the specified contact person, the context information being persistently displayed in a first area located at a reserved location within a portion of a graphical user interface (GUI);

display a first view set of information in a second area in a different portion of the GUI; and in response to input received from the agent during the session, display a second view set of information in the second area of the GUI, wherein the context information in the first area remains persistently displayed in the first area of the GUI.

16. The computer-readable data storage medium including the computer program product of claim 15, wherein the context information comprises a level of customer service associated with the contact person.

* * * * *